US011624492B2

(12) United States Patent
Nykerk

(10) Patent No.: US 11,624,492 B2
(45) Date of Patent: Apr. 11, 2023

(54) DOUBLE-SIDED OPTICAL SHEETS

(71) Applicant: Flex-N-Gate Advanced Product Development, LLC, Tecumeseh (CA)

(72) Inventor: Todd Nykerk, Holland, MI (US)

(73) Assignee: Flex-N-Gate Advanced Product Development, LLC, Tecumseh (CA)

( * ) Notice: Subject to any disclaimer, the term of this patent is extended or adjusted under 35 U.S.C. 154(b) by 15 days.

(21) Appl. No.: 17/032,622

(22) Filed: Sep. 25, 2020

(65) Prior Publication Data

US 2021/0095831 A1 Apr. 1, 2021

Related U.S. Application Data

(60) Provisional application No. 62/907,015, filed on Sep. 27, 2019.

(51) Int. Cl.
*F21V 5/00* (2018.01)
*F21S 41/20* (2018.01)
*F21S 41/143* (2018.01)
*F21S 41/153* (2018.01)
*F21S 43/20* (2018.01)
(Continued)

(52) U.S. Cl.
CPC ............ *F21V 5/008* (2013.01); *B29C 43/184* (2013.01); *B29C 48/002* (2019.02); *B29C 59/022* (2013.01); *B29C 59/026* (2013.01); *F21S 41/143* (2018.01); *F21S 41/153* (2018.01); *F21S 41/285* (2018.01); *F21S 43/14* (2018.01); *F21S 43/26* (2018.01); *F21S 43/33* (2018.01); *F21V 5/007* (2013.01);
(Continued)

(58) Field of Classification Search
CPC ...................................................... F21S 43/26
See application file for complete search history.

(56) References Cited

U.S. PATENT DOCUMENTS 6,132,652 A 10/2000 Higuchi et al.
7,789,538 B2 * 9/2010 Epstein ............ G02F 1/133606
362/333
(Continued)

FOREIGN PATENT DOCUMENTS

JP 2007171625 A 7/2007
JP 2008044136 A 2/2008
WO 9852733 A1 11/1998

OTHER PUBLICATIONS

PCT Patent Application No. PCT/US2020/052720 International Search Report and Written Opinion dated Nov. 24, 2020.

*Primary Examiner* — William N Harris
(74) *Attorney, Agent, or Firm* — Avek IP, LLC

(57) ABSTRACT

Disclosed are methods for forming a double-sided optical sheet, and a vehicle lamp assembly having the double-sided optical sheet integrated therein. A first optical pattern is imprinted on a first side of a material, and a second optical pattern is imprinted on a second side of the material, opposite the first side. The first and second optical patterns are thereby formed on opposing sides of the same sheet. When oriented adjacent a light source, the double-sided optical sheet homogenizes light emitted from the light source. For a light source having a plurality of lighting elements, the double-sided optical sheet is configured to blend light emitted from the plurality of lighting elements to form one homogenous beam of light output resulting from a single light-modifying member.

11 Claims, 12 Drawing Sheets

(51) Int. Cl.

| | | |
|---|---|---|
| *F21S 43/14* | (2018.01) | |
| *F21S 43/33* | (2018.01) | |
| *F21Y 105/16* | (2016.01) | |
| *F21Y 115/10* | (2016.01) | |
| *B29C 48/00* | (2019.01) | |
| *B29C 59/02* | (2006.01) | |
| *B29C 43/18* | (2006.01) | |
| *B29L 11/00* | (2006.01) | |

(52) U.S. Cl.
CPC .... *B29L 2011/0016* (2013.01); *F21Y 2105/16* (2016.08); *F21Y 2115/10* (2016.08)

(56) References Cited

U.S. PATENT DOCUMENTS

| | | | |
|---|---|---|---|
| 8,702,288 B2* | 4/2014 | Brown | F21S 43/14 |
| | | | 362/520 |
| 10,436,404 B2* | 10/2019 | Lee | F21S 43/40 |
| 10,753,579 B2 | 8/2020 | Nykerk et al. | |
| 2005/0270654 A1* | 12/2005 | Goto | G02B 19/0028 |
| | | | 359/626 |
| 2007/0076406 A1* | 4/2007 | Kodama | G02F 1/133606 |
| | | | 362/296.07 |
| 2009/0091919 A1* | 4/2009 | Goto | G02F 1/133606 |
| | | | 362/97.1 |
| 2013/0329444 A1* | 12/2013 | Oh | F21S 43/195 |
| | | | 362/543 |
| 2015/0345737 A1* | 12/2015 | Ito | F21S 43/26 |
| | | | 362/311.06 |
| 2020/0026091 A1 | 1/2020 | Nykerk | |

\* cited by examiner

DOUBLE-SIDED OPTICAL SHEETS

CROSS-REFERENCE TO RELATED APPLICATIONS

This application claims the benefit of U.S. Provisional Patent Application No. 62/907,015 entitled "Double-Sided Optical Sheets" and filed on Sep. 27, 2019, which is herein incorporated by reference in its entirety.

BACKGROUND

1. Field

Embodiments of this disclosure relate generally to lighting assemblies and more specifically to automotive vehicle lamp assemblies.

2. Description of the Related Art

The use of optical films/sheets in vehicle lamp assemblies is known. For example, U.S. Patent Application Publication No. 2020/0026091 to Nykerk discloses a floating image apparatus that includes first and second layers of optical films for collectively focusing light emitted from a light source. U.S. Pat. No. 10,753,579 to Nykerk et al. discloses an animated 3D image multiplying light assembly that includes first and second optical sheets for altering light emitted from a light source.

SUMMARY

In an embodiment, a double-sided optical sheet is created via an extrusion process in which lenticular patterns are impressed on opposite sides of an optical sheet using engraved cylindrical drums. The first pattern may be oriented laterally, while the second pattern is oriented longitudinally for shaping light in both the lateral and longitudinal directions. The double-sided optical sheet is arranged adjacent a light source to homogenize light output and reduce hot spots.

In another embodiment, a lamp assembly includes a light source and an optical sheet oriented to receive light emitted from the light source. A first pattern of light-modifying elements is disposed on a first side of the optical sheet, and a second pattern of light-modifying elements is disposed on a second side of the optical sheet opposite the first side. Light from the light source is homogenized via the first pattern of light-modifying elements and the second pattern of light-modifying elements.

In yet another embodiment, an extrusion method for forming a double-sided optical sheet includes extruding a material from an extruder imprinting a first lenticular pattern onto a first side of the material via a first drum, the first drum having a first pattern on its outer surface. The method further includes imprinting a second lenticular pattern onto a second side of the material opposite the first side via a second drum, the second drum having a second pattern on its outer surface, such that the material is formed into an optical sheet having the first lenticular pattern on the first side and the second lenticular pattern on a second side.

In still another embodiment, a compression molding method for forming a double-sided optical sheet includes providing a first mold having a first mold pattern; providing a second mold having a second mold pattern; arranging the first mold adjacent the second mold to form a mold cavity; melting a material and providing the melted material to the mold cavity; cooling the material to solidify the material; and removing the first mold and the second mold such that a double-sided optical sheet is formed having a first optical pattern on a first side according to the first mold pattern and a second optical pattern on a second side, opposite the first side, according to the second mold pattern This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

BRIEF DESCRIPTION OF THE DRAWINGS

Illustrative embodiments of the present disclosure are described in detail below with reference to the attached drawing figures, which are incorporated by reference herein and wherein.

Figure 1:
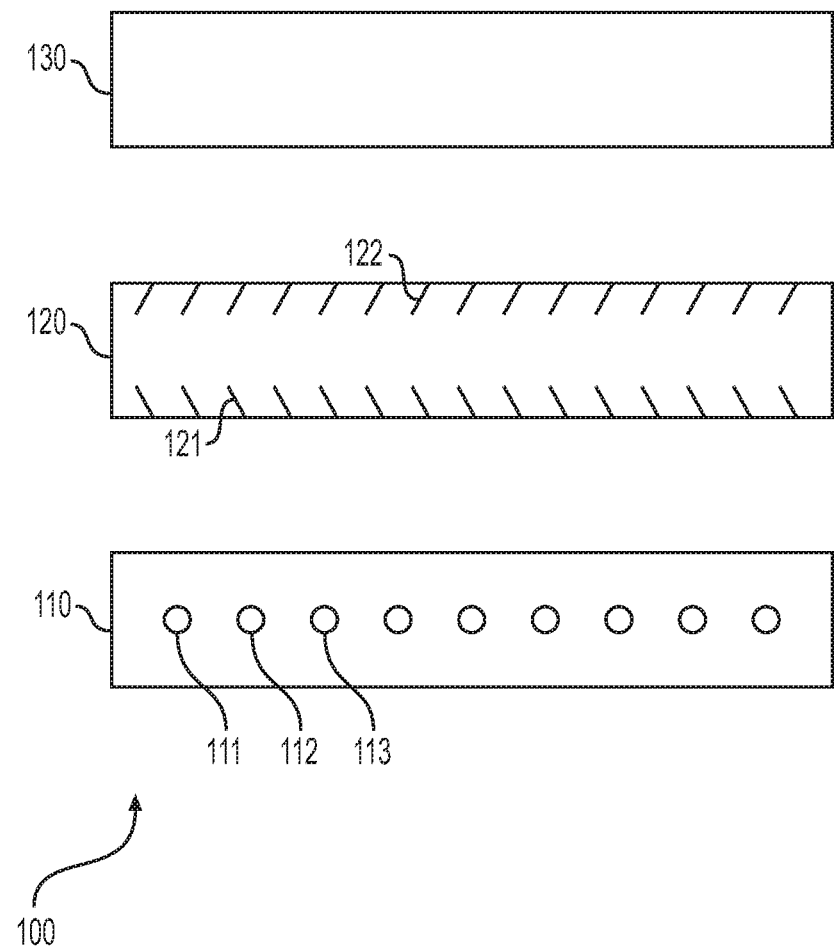
FIG. 1 shows an exploded view of a vehicle lamp assembly having a double-sided optical sheet, in an embodiment.

The drawing figures do not limit the invention to the specific embodiments disclosed and described herein. The drawings are not necessarily to scale, emphasis instead being placed upon clearly illustrating the principles of the disclosure.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

In various lighting applications, optical sheets may be used to affect light emitted from a light source. The optical sheets are for example optically clear plastic sheets having an array of light modifying elements (e.g., lenticular lenses) on one side, with the opposite side being flat. The array of light modifying elements may be imprinted or molded on the sheet in a pattern. Depending on the size, shape, and focal length of the individual light modifying elements, as well as their collective pattern on the sheet, the optical sheets may be used to shape light from a light source in various ways. For example, light may be shifted, magnified, smoothed, homogenized, etc. To provide different lighting effects, multiple lenticular sheets may be layered on top of one another. The multiple sheets may be layered with varying orientations of lenticular patterns to scatter light in numerous directions. Different optical sheets and their uses are described in U.S. Patent Application Publication No. 2020/0026091 to Nykerk and U.S. Pat. No. 10,753,579 to Nykerk et al., which are both hereby incorporated by reference in their entirety.

Embodiments of the present disclosure provide methods for producing a single optical sheet having lenticular patterns on both sides. In some embodiments, a first lenticular pattern on a first side of the sheet is oriented in a first direction, while a second lenticular pattern is provided on the second side of the sheet and is oriented in a second direction which is different than the first direction. Such a double-sided optical sheet may be used to effectively homogenize light output using only a single sheet rather than layering multiple one-sided sheets (i.e., optical sheets having a lenticular pattern imprinted on only one side).

Homogenizing emitted light is an important function for vehicle lamps because non-homogenized light having hot spots can be distracting and even blinding to other drivers. Homogenizing emitted light provides an even illumination that avoids hot spots. In addition, homogenizing emitted light provides a broader distribution of light output, thereby providing illumination to a larger field of view for the driver. Providing a larger field of view is an important safety feature for assisting the driver with identifying potentially hazardous road conditions more easily.

FIG. 1 shows an exploded view of an exemplary vehicle lamp assembly 100 having a double-sided optical sheet 120. A light source 110 is positioned beneath optical sheet 120. In some embodiments, light source 110 includes a plurality of light-emitting diodes (LEDs) mounted on a printed-circuit board (PCB). For example, as depicted in FIG. 1, light source includes a first LED 111, a second LED 112, a third LED 113, etc. Not all LEDs are enumerated for clarity of illustration. Each of the individual LEDs may be independently lit and unlit via a controller (not shown) that is electrically and communicatively coupled with the PCB. The LEDs may be all of one type or of a plurality of sizes, colors, and/or intensities.

Double-sided optical sheet 120 is an optically clear sheet made of plastic with a lenticular pattern (e.g., a pattern of lenticular lenses) molded into each side of optical sheet 120. Double-sided optical sheet 120 is adapted to act as a light-modifying component of vehicle lamp assembly 100 for homogenizing light emitted from light source 110. Each side of optical sheet 120 is impressed with a first lenticular pattern 121 or a second lenticular pattern 122, as further described below. A lenticular pattern is an array of light-modifying elements, such as an array of convex lenses, that each focus light according to a particular focal length. The lenticular pattern may be aligned in a particular direction throughout a respective optical sheet. In certain embodiments, first lenticular pattern 121 is arranged differently than second lenticular pattern 122 to intentionally scatter light in different directions. In some embodiments, the first and second lenticular patterns 121, 122 are configured to distribute light rays evenly so as to appear homogenous to the viewer. For example, first lenticular pattern 121 is oriented in a first direction that is offset by a predetermined angle from a second direction in which second lenticular pattern 122 is oriented. In embodiments, the predetermined angle between first and second lenticular patterns 121, 122 is about ninety degrees such that the first direction is oriented perpendicular to the second direction (e.g., the first direction is aligned laterally/horizontally and the second direction is aligned longitudinally or vertically). However, other angles between the lenticular patterns 121, 122 may be provided without departing from the scope hereof.

An outer lens 130 is disposed adjacent double-sided optical sheet 120 opposite light source 110. Outer lens 130 may be made of a transparent material adapted to protect optical sheet 120 from outside elements while allowing light to pass through. Light source 110, optical sheet 120, and outer lens 130 may be structurally supported and held in alignment with one another via a housing (not shown) of the lamp assembly. In some embodiments, outer lens 130 and optical sheet 120 are aligned substantially adjacent to one another (e.g., touching one another).

Figure 2:
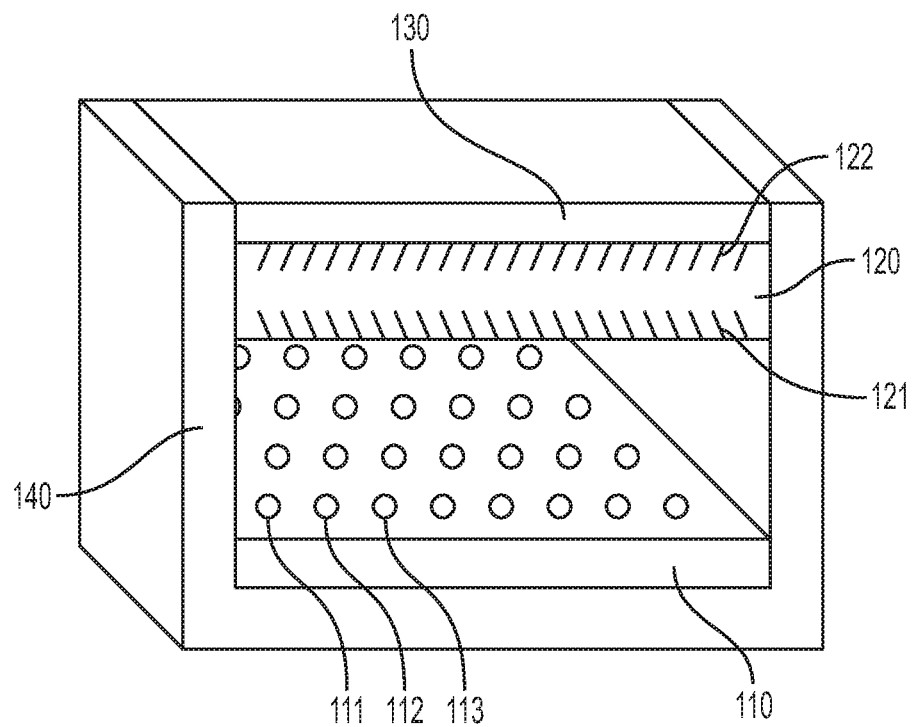
FIG. 2 shows a perspective view of a vehicle lamp assembly, in an embodiment.

FIG. 2 shows a perspective view of an exemplary vehicle lamp assembly 100. The vehicle lamp assembly 100 is for example a rear combination lamp (RCL); however, the subject matter is not limited to this particular embodiment and other vehicle lamps (e.g., low-beam and high-beam headlamps, center high-mounted stop lamps, turn signals, lamps for aesthetic appearances, etc.) are contemplated. The assembly comprises a light source 110, which in this embodiment is an array of LEDs. Individual LEDs 111-113 of the array are labeled, although there may be a plurality of additional LEDs not labeled for clarity of the figure. Alternatively, light source 110 may use a halogen bulb or a plurality of halogen bulbs, as well as other types of light sources.

Each of the components including light source 110, double-sided optical sheet 120, and outer lens 130, are held in place by a housing 140 which acts as a rigid enclosure to align the components in the appropriate position and provide an outer protective layer. The housing 140 may be formed into various shapes according to a specific vehicle lamp assembly 100 designed to conform with and compliment a specific vehicle.

In operation, individual LEDs of light source 110 emit light that shines through double-sided optical sheet 120. As light passes through each of the first and second lenticular patterns 121 and 122, which are oriented at a different angle from one another, light is refracted in different directions and distributed in a homogenous fashion. The homogenized light is projected via outer lens 130 into the environment to illuminate nearby objects or signal other drivers.

To convey a particular embodiment of the invention in operation, the path of the light through vehicle lamp assembly 100 will be considered. The light path begins at light source 110 which emits multiple rays of light. The light is relatively focused and will retain hotspots, especially at locations directly in front of the individual LEDs 111, 112, 113. As the light rays pass through first lenticular pattern 121, the light rays are refracted depending on the location where the light rays come into contact with first lenticular pattern 121. In other words, the paths of individual light rays are refracted differently, providing different output angles of light, due to different input angles with respect to the lenticular lenses.

Next, the light rays are refracted by second lenticular pattern 122 differently than first lenticular pattern 121 due to the different orientations of the first and second patterns 121, 122. Collectively, double-sided optical sheet 120 effectively disperses the light rays by refracting the light paths in different directions, thereby un-focusing the light and reducing hotspots.

Figure 3:
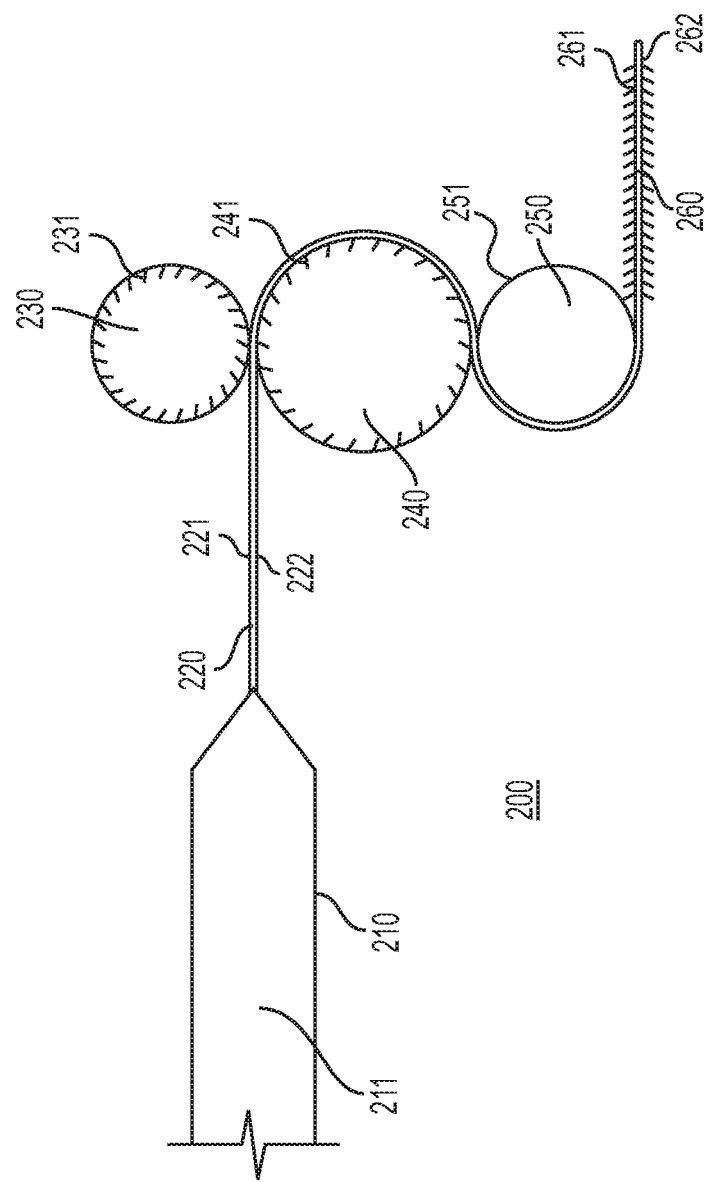
FIG. 3 shows a diagram featuring an embodiment of an extrusion process by which some embodiments described herein may be produced.

FIG. 3 shows a diagram featuring an exemplary extrusion process 200 by which some embodiments described above may be produced. First hot plastic material is ejected from extruder 210 via resin screw 211 to form a plastic sheet 220 having a first side 221 and a second side 222 opposite the first side 221.

Next, plastic sheet 220 is guided between a first drum 230 and a second drum 240. First and second drums 230, 240 both have a cylindrical shape. In certain embodiments, first drum 230 has a smaller diameter than second drum. For example, first drum 230 may have a 12-inch diameter and second drum 240 may have a 16-inch diameter.

In the embodiment depicted in FIG. 3, a first pattern 231 is disposed on the outer surface of first drum 230, and a second pattern 241 is disposed on the outer surface of second drum 240. The first and second patterns 231, 241 may be engraved in the outer surfaces of their respective drums, for example. As the first and second drums rotate in opposite directions (e.g., first drum 230 rotates counter-clockwise and second drum 240 rotates clockwise), plastic sheet 220 is compressed between the first and second drums 230 and 240, which simultaneously imprints the first and second patterns 231, 241 into the opposing surfaces of sheet 220. Specifically, first pattern 231 is pressed onto first side 221 and second pattern 241 is pressed onto second side 222.

In certain embodiments, first and second patterns 231 and 241 may be oriented at different angles that are offset from one another. For example, first pattern 231 may provide a lateral pattern on first side 221, while second pattern 241 provides a longitudinal pattern on second side 222, where the lateral pattern is substantially perpendicular to the longitudinal pattern. The first and second patterns 231, 241 may be swapped or their orientations altered without departing from the scope hereof.

A first gap between first drum 230 and second drum 240 is configured to provide a final thickness of optical sheet 260. For example, the first gap forms a pinch point that is smaller than an initial thickness of plastic sheet 220, such that sheet 220 is squeezed as it passes through the first gap.

A second gap between second drum 240 and third drum 250 is configured to match the first gap, but the thickness of the sheet 220 has largely been established after having passed through the first gap. A speed at which plastic sheet 220 is pulled through the first gap and a temperature of plastic sheet 220 as it is pulled through the first gap may also affect the final thickness of optical sheet 260.

Plastic sheet 220 is then guided between second drum 240 and a third drum 250. In certain embodiments, third drum 250 has a smaller diameter than second drum 240. Third drum 250 is for example a 12-inch diameter cylindrical drum like first drum 230. In the embodiment of FIG. 3, third drum 250 is a blank drum comprising a flat surface 251, which does not transfer any lenticular pattern to sheet 220. Third drum 250 rotates in a direction opposite that of second drum 240 (e.g., third drum rotates counter-clockwise) and guides sheet 220 tightly around second drum 240 so as to maintain contact of second side 222 with second pattern 241 while second drum 240 rotates.

From extrusion process 200, a double-sided optical sheet 260 is produced, which is an example of double-sided optical sheet 120 of FIG. 1 and FIG. 2. Double-sided optical sheet 260 comprises first lenticular pattern 261, which corresponds to first pattern 231, and second lenticular pattern 262, which corresponds to second pattern 241. The first and second lenticular patterns 261, 262 are formed on opposing sides of the same optical sheet 260.

Figure 4:
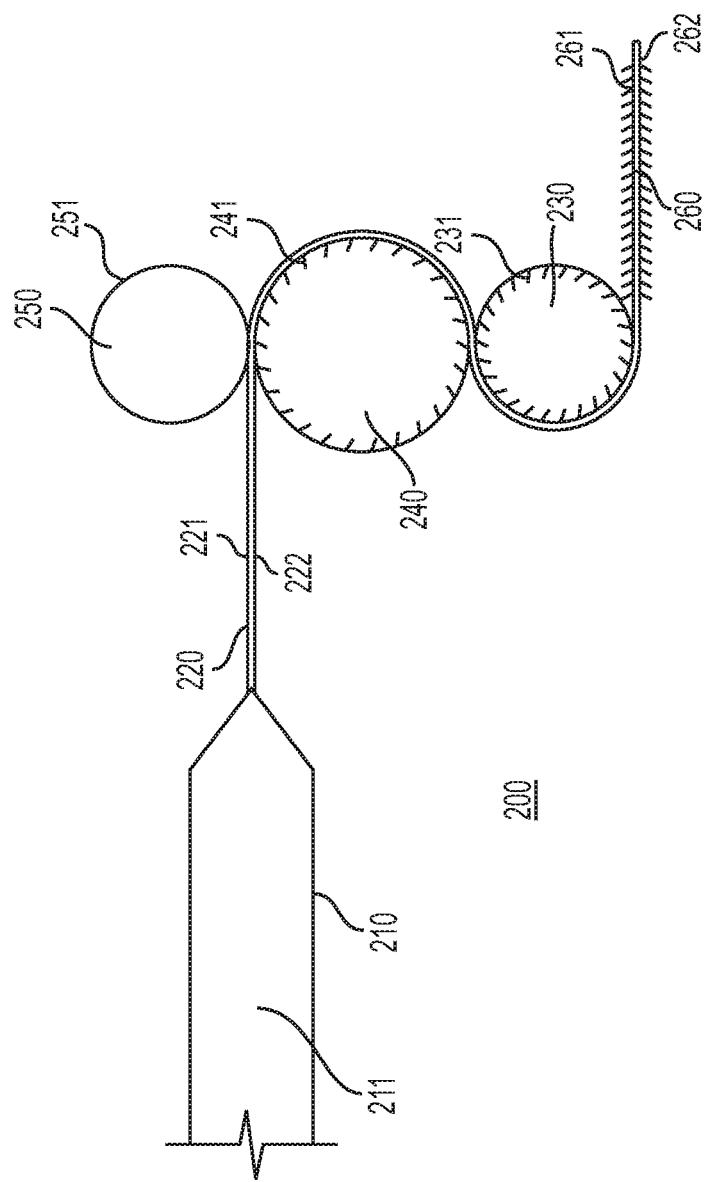
FIG. 4 shows a diagram featuring a variation of the extrusion process of FIG. 3.

FIG. 4 shows a diagram featuring a variation to extrusion process 200 of FIG. 3. Items enumerated in FIG. 4 with like numerals to FIG. 3 are the same or similar and their description may not be repeated accordingly. In the embodiment depicted in FIG. 4, first drum 230 and third drum 250 are swapped. In this case, third drum 250, which is blank, forms a first gap with second drum 240 to imprint second side 222 with second pattern 241. Sheet 220 remains tightly pressed against second drum 240 as it rotates and guides sheet 220 to a second gap formed between second drum 240 and first drum 230. Subsequently, sheet 220 is guided between second drum 240 and first drum 230 to imprint first side 221 with first pattern 231.

In this manner, a double-sided optical sheet 260 is produced, which is an example of double-sided optical sheet 120 of FIG. 1 and FIG. 2. As with the embodiment of FIG. 3, double-sided optical sheet 260 comprises first lenticular pattern 261, which corresponds to first pattern 231, and second lenticular pattern 262, which corresponds to second pattern 241. As a result, first and second lenticular patterns 261, 262 are formed on opposing sides of the same optical sheet 260.

In certain embodiments, first drum 230 and third drum 250 are substantially identical except for the engraving of a lenticular pattern. In other words, one of first and third drums 250 has an engraved lenticular pattern on its outer surface while the other has a flat outer surface. The difference between the embodiment depicted in FIG. 3 and the embodiment depicted in FIG. 4 is simply that the first drum 230 and third drum 250 are swapped; alternatively, the arrangement of the drums may stay the same while sheet 220 is wound around the drums in the opposite direction (e.g., using the FIG. 3 arrangement of drums, sheet 220 is first introduced between second drum 240 and third drum 250 before passing between second drum 240 and first drum 230.

In the FIG. 3 embodiment, the first and second lenticular patterns 261, 262 are being simultaneously impressed into opposite sides of sheet 220 as it passes between two engraved drums (e.g., first drum 230 and second drum 240). In the FIG. 4 embodiment, the first and second lenticular patterns 261, 262 are being sequentially impressed in opposite sides of sheet 220, as second pattern 241 is impressed on second side 222 followed by first pattern 231 being impressed on first side 221. In other words, sheet 220 is either first introduced between two engraved drums and subsequently passed between one engraved drum and one blank drum (as depicted in FIG. 3), or sheet 220 is first introduced between one engraved drum and one blank drum and subsequently passed between two engraved drums (as depicted in FIG. 4).

In the FIG. 3 embodiment, plastic sheet 220 is hotter when it reaches the first gap (between first drum 230 and second drum 240) compared to when it reaches the second gap (between second drum 240 and third drum 250) because sheet 220 is exposed to ambient air after being extruded from extruder 210 and cools over time. The first pattern 231 and the second pattern 241 are impressed at the pinch point created by the first gap after which sheet 220 cools before reaching the second gap. Sheet 220 is held against second pattern 241 as second drum 240 is rotated 180° providing a longer time for sheet 220 to conform to second pattern 241, whereas first pattern 231 does not receive this extended contact with sheet 220.

In the FIG. 4 embodiment, sheet 220 has cooled to a lower temperature before making contact with first pattern 231; however, sheet 220 is held against the first pattern 231 as first drum 230 is rotated 180° providing a longer time for sheet 220 to conform to the first pattern 231. The longer time in contact with the engraved pattern on each drum may provide an improvement in the forming of each respective lenticular pattern.

Figure 5:
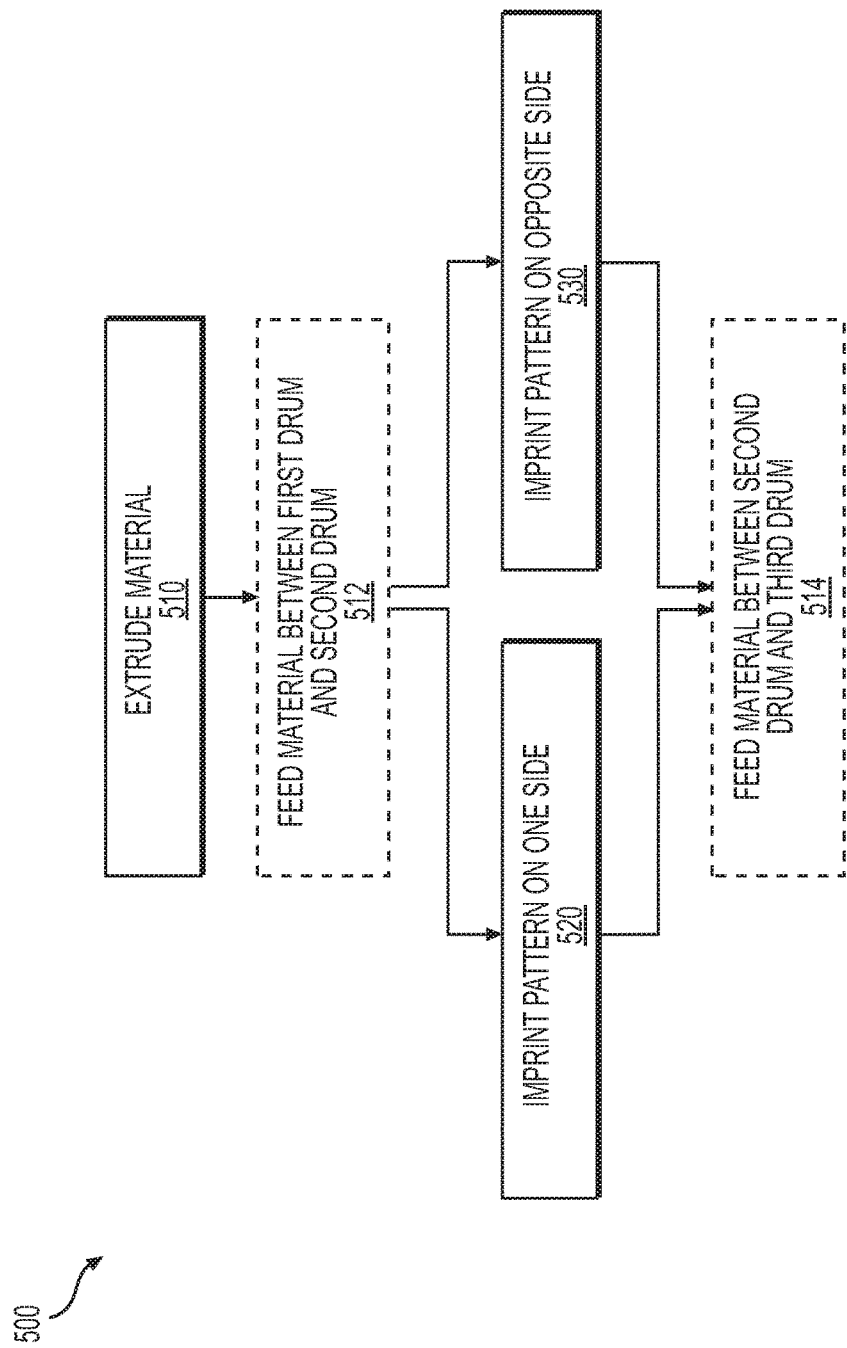
FIG. 5 is a block diagram showing steps of an exemplary extrusion method for forming a double-sided optical sheet, in an embodiment.
Figure 6:
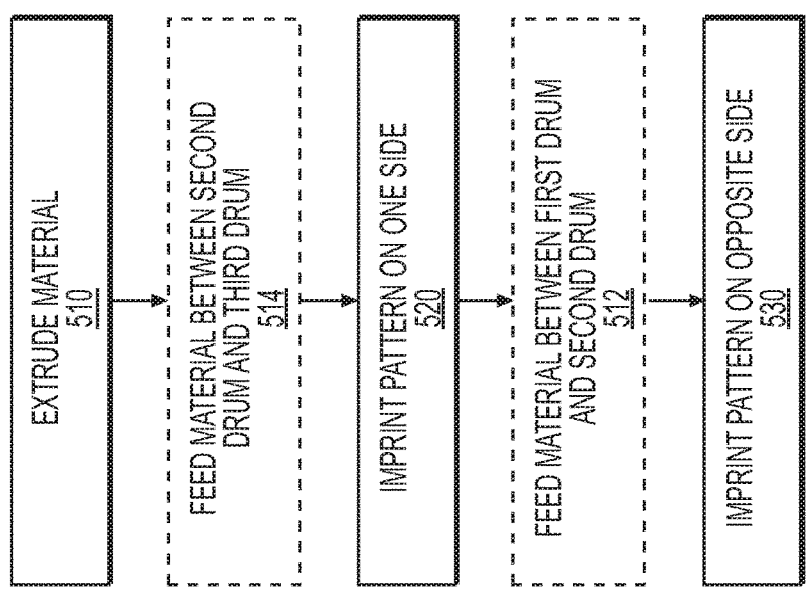
FIG. 6 is a block diagram showing steps of an alternative extrusion method for forming a double-sided optical sheet, in an embodiment.

FIG. 5 shows an exemplary extrusion method 500 for forming a double-sided optical sheet, which corresponds to the diagram of FIG. 3. FIG. 6 shows an exemplary extrusion method 600 for forming a double-sided optical sheet, which corresponds to the diagram of FIG. 4. FIGS. 5 and 6 share the same steps, but the steps may be carried out in different orders depending on the arrangement of first, second, and third drums 230, 240, 250, as depicted in FIGS. 3 and 4. FIGS. 5 and 6 are best viewed together with the following description.

In a step 510, a material is extruded from an extruder. In an example of step 510, a hot plastic material is ejected from extruder 210 via resin screw 211 to form a plastic sheet 220 having a first side 221 and a second side 222 opposite the first side 221, as depicted in FIGS. 3 and 4.

In an optional step 512, material is fed between a first drum and a second drum. In an example of step 512, plastic sheet 220 is fed between first drum 230 and second drum 240. As depicted in FIG. 5, step 512 is carried out after step 510. After step 512, method 500 proceeds to both steps 520 and 530 simultaneously since sheet 220 is fed between two engraved drums (e.g., first and second drums 230, 240, as depicted in FIG. 3). As depicted in FIG. 6, step 512 is carried out after step 520, corresponding with FIG. 4.

In a step 520, a lenticular pattern is imprinted onto one side of the material via a drum, the drum having a pattern on its outer surface. In an example of step 520 corresponding with FIG. 5, an engraved first pattern 231 of first drum 230 is pressed onto first side 221 of plastic sheet 220 as depicted in FIG. 3. In another example of step 520 corresponding with FIG. 6, an engraved second pattern 241 of second drum 240 is pressed onto second side 222 of sheet 220 as depicted in FIG. 4.

In a step 530, another lenticular pattern is imprinted onto the opposite side of the material from step 520 via another drum having another pattern on its outer surface. In an example of step 530 corresponding with FIG. 5, an engraved second pattern 241 of second drum 240 is pressed into second side 222 of plastic sheet 220 as depicted in FIG. 3, such that the sheet 220 is formed into double-sided optical sheet 260 having a first lenticular pattern 261 on one side and a second lenticular pattern 262 on the opposite side. In another example of step 530 corresponding with FIG. 6, an engraved first pattern 231 of first drum 230 is pressed onto first side 221 of plastic sheet 220 as depicted in FIG. 4, such that sheet 220 is formed into double-sided optical sheet 260 having a first lenticular pattern 261 on one side and a second lenticular pattern 262 on the opposite side.

In an optional step 514, material is fed between a second drum and a third drum. In an example of step 514 corresponding with FIG. 5, sheet 220 is fed between second drum 240 and third drum 250, as depicted in FIG. 3. In an example of step 514 corresponding with FIG. 6, sheet 220 is first introduced between second drum 240 and third drum 250.

In the embodiment corresponding with FIGS. 3 and 5, steps 520 and 530 are performed simultaneously as plastic sheet 220 passes between first drum 230 having first pattern 231 and second drum 240 having second pattern 241 (in step 512). In the embodiment corresponding with FIGS. 4 and 6, steps 520 and 530 are performed sequentially as sheet 220 passes between third drum 250 having blank surface 251 and second drum 240 having second pattern 241 (in step 514), followed by sheet 220 passing between second drum 240 and first drum 230 having first pattern 231 (in step 512).

Figure 7:
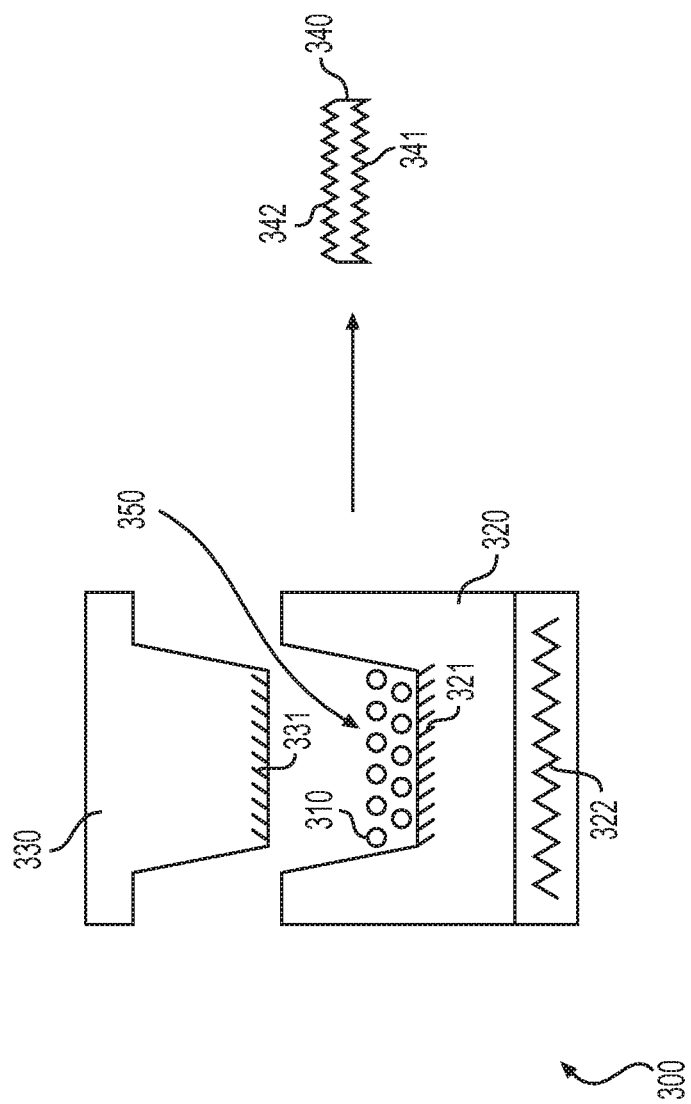
FIG. 7 shows a diagram featuring an embodiment of a compression molding process by which some embodiments described herein may be produced.

FIG. 7 is a diagram depicting an exemplary compression molding process that may be used to manufacture double-sided optical sheets in certain embodiments. Granules 310 are placed in lower mold 320 which is fixed in place. Granules 310 are for example pieces of plastic, such as an optically clear plastic. The top surface of lower mold 320 comprises a first pattern 321. A heat source is provided to melt the granules into a liquid or semi-liquid state. For example, a heating element 322 may be provided beneath lower mold 320 for melting the granules, although other heat sources may be used without departing from the scope hereof.

Additionally, upper mold 330 is movable and located above lower mold 320 as to create a mold cavity 350 between upper mold 330 and lower mold 320. Upper mold 330 includes a second pattern 331, which may be oriented at an offset angle (e.g., perpendicular) to first pattern 321. First and second patterns 321, 331 are for example engraved into the lower and upper molds, respectively.

Upper mold 330 is moved downward restricting mold cavity 350 to a desired shape while granules 310 are in the liquid or semi-liquid state due to added heat (e.g., from heating element 322). The melted material takes the shape of mold cavity 350 including lower surface with first pattern 321 and upper surface with second pattern 331.

Heat is then removed (e.g., heating element 322 is turned off) allowing the melted material to cool and solidify, thereby forming a double-sided optical sheet 340. Optical sheet 340 includes the lower surface having a first lenticular pattern 341 corresponding to first pattern 321, and the upper surface having a second lenticular pattern 342 corresponding to second pattern 331. As with double-sided optical sheet 260 of FIG. 3 and FIG. 4, double-sided optical sheet 340 includes first and second lenticular patterns 341, 342 formed on opposing sides of the same optical sheet 340.

Figure 8:
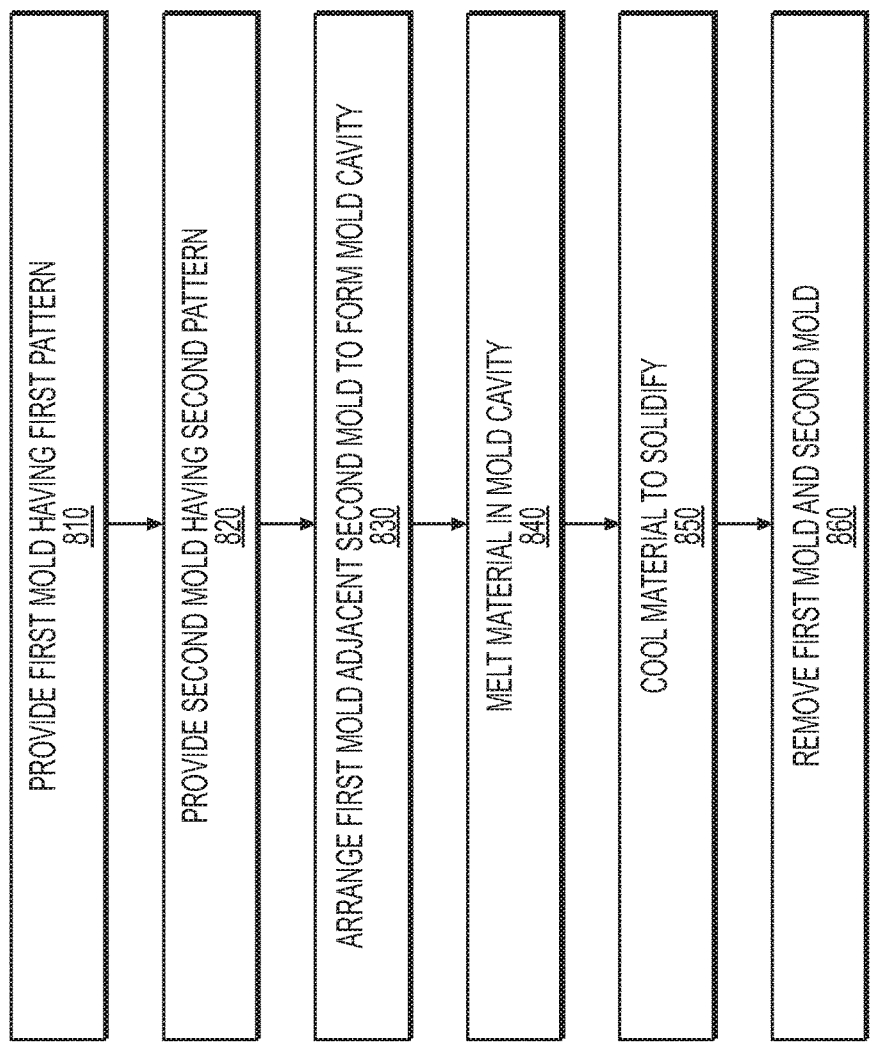
FIG. 8 is a block diagram showing steps of an exemplary compression molding method for forming a double-sided optical sheet, in an embodiment.

FIG. 8 shows an exemplary extrusion method 800 for forming a double-sided optical sheet, which corresponds to the diagram of FIG. 7.

In a step 810, a first mold having a first mold pattern is provided. In an example of step 810, lower mold 320 having first pattern 321 is provided, as depicted in FIG. 7.

In a step 820, a second mold having a second mold pattern is provided. In an example of step 820, upper mold 330 having a second pattern 331 is provided, as depicted in FIG. 7.

In a step 830, the first mold is arranged adjacent the second mold to form a mold cavity. In an example of step 830, lower mold 320 is arranged adjacent upper mold 330 to form mold cavity 350.

In a step 840, a material is melted and the melted material is provided to the mold cavity. In an example of step 840, granules 310 are melted in mold cavity 350 via heat from heating element 322, as depicted in FIG. 7.

In a step 850, the material is cooled to solidify the material. In an example of step 850, heat is then removed by turning heating element 322 off and allowing the melted material to cool and solidify.

In a step 860, the first mold and the second mold are removed such that a double-sided optical sheet is formed having a first optical pattern on a first side according to the first mold pattern and a second optical pattern on a second side, opposite the first side, according to the second mold pattern. In an example of step 860, lower mold 320 and upper mold 330 are removed to form double-sided optical sheet 340 having first lenticular pattern 341 on the lower surface and second lenticular pattern 342 on the upper surface.

As with double-sided optical sheet 260 of FIG. 3 and FIG. 4, the first lenticular pattern 341 and second lenticular pattern 342 may be oriented for modulating light passing through double-sided optical sheet 340. For example, first lenticular pattern 341 may be oriented differently from second lenticular pattern 342 by an offset angle. In some embodiments, the offset angle is approximately ninety degrees such that the first lenticular pattern 341 and second lenticular pattern 342 are oriented substantially perpendicular to one another.

Figure 9:
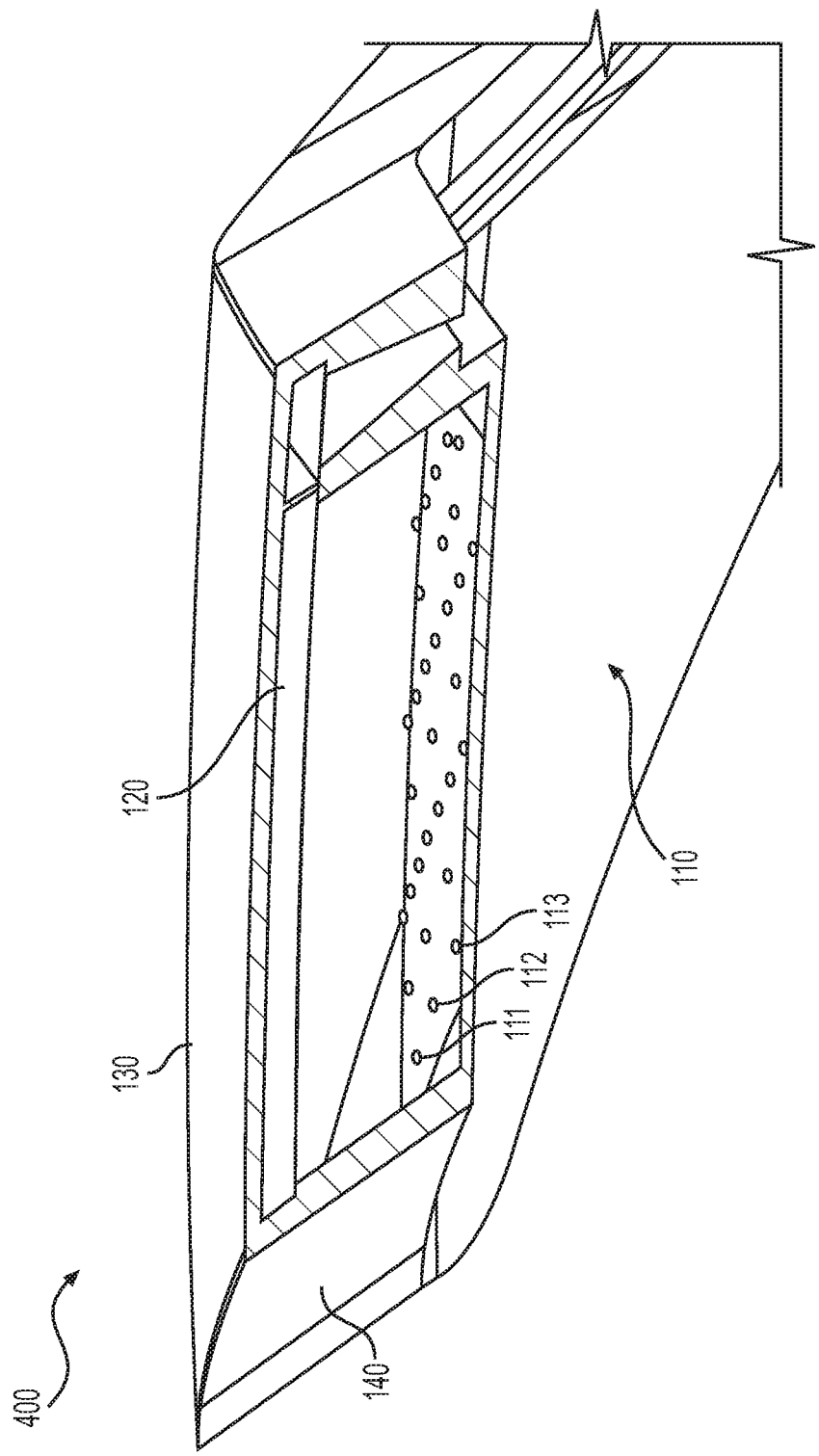
FIG. 9 shows a cross-sectional view of a vehicle lamp assembly having a double-sided optical sheet, in an embodiment.
Figure 10:
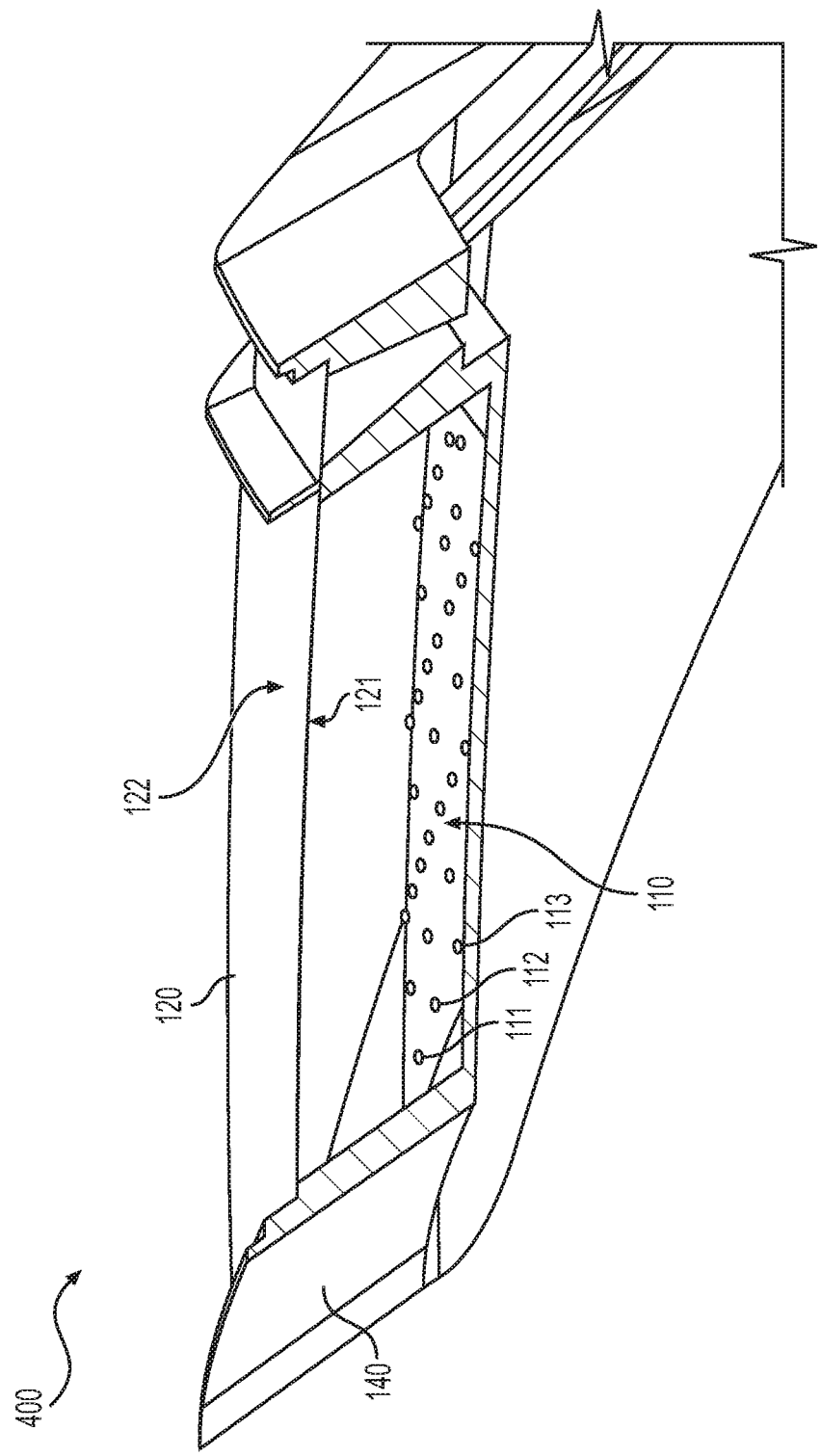
FIG. 10 shows the cross-sectional view of FIG. 9 with an outer lens removed.
Figure 11:
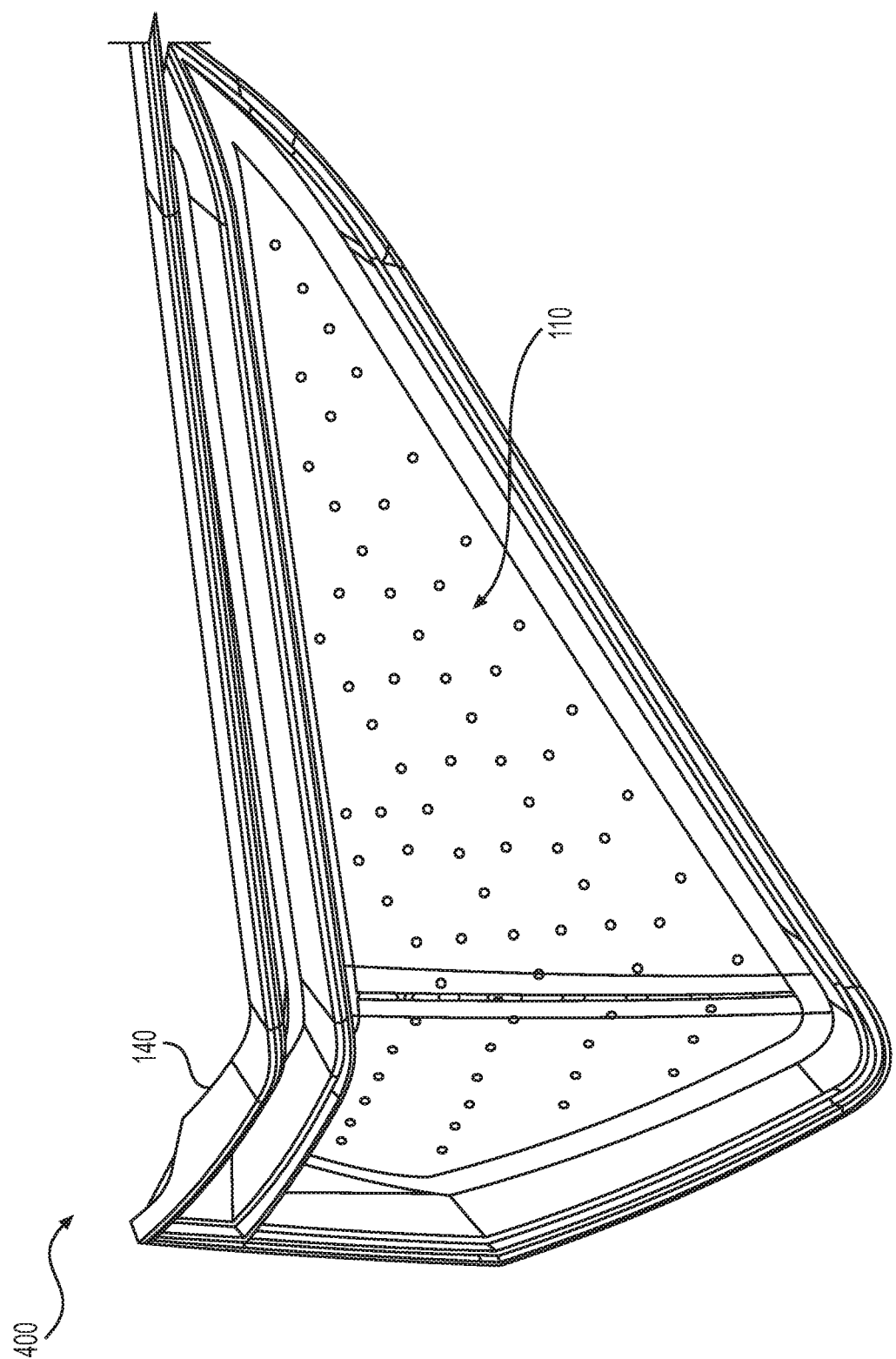
FIG. 11 shows a perspective view of the vehicle lamp assembly of FIG. 9 with the outer lens and the single optical sheet removed.
Figure 12:
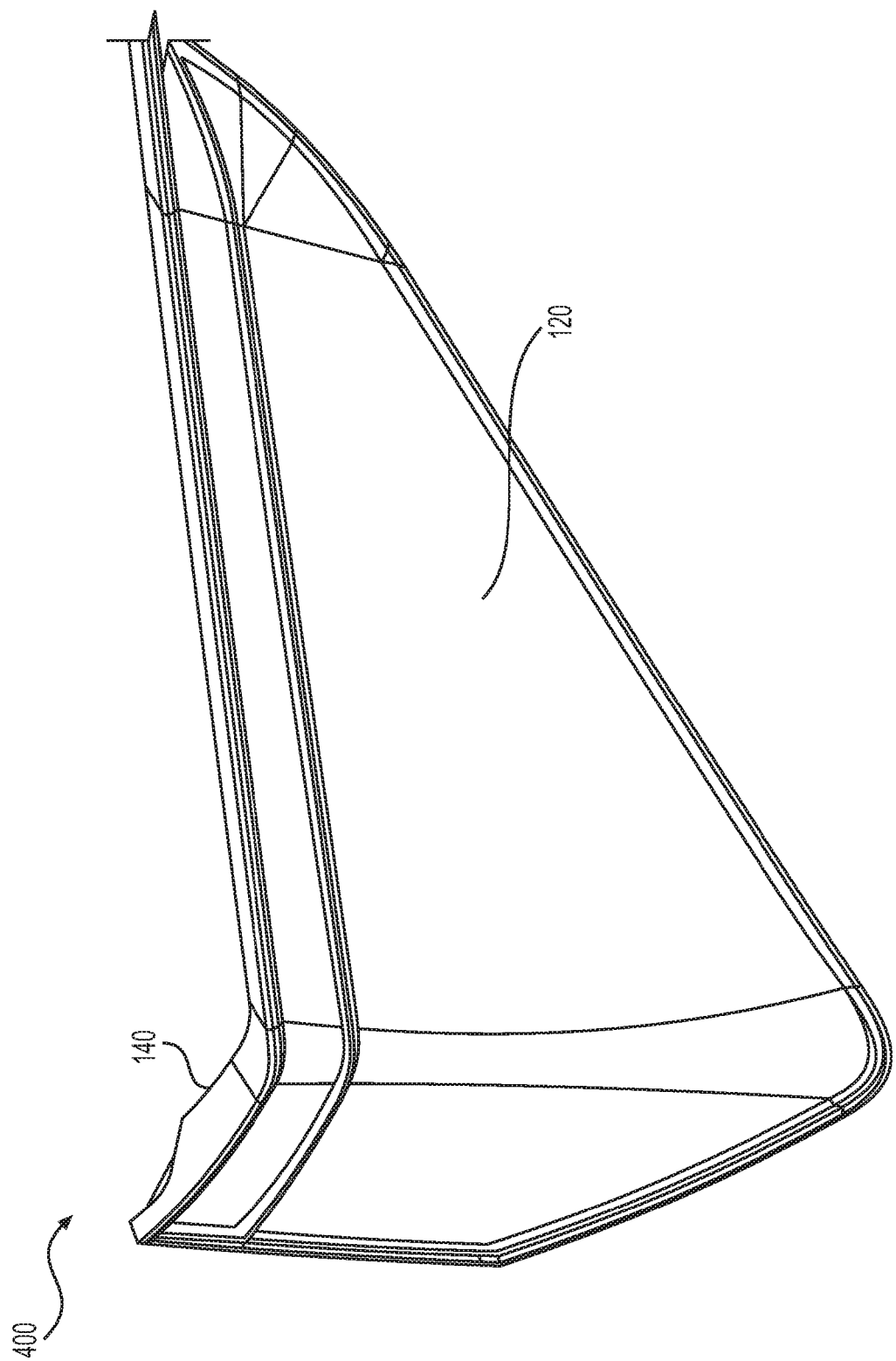
FIG. 12 shows a perspective view of the vehicle lamp assembly of FIG. 11 with the outer lens removed.

FIGS. 9-12 show an exemplary vehicle lamp assembly 400, which is an example of vehicle lamp assembly 100 of FIG. 2. Items enumerated with like numerals are the same or similar and their description is not repeated accordingly. In FIGS. 9, 10, and 12, the lenticular patterns on double-sided optical sheet 120 are two small to be visible.

FIG. 9 shows a cross-sectional view of vehicle lamp assembly 400 having double-sided optical sheet 120. Rather than using two optical sheets each having a lenticular pattern on only one side, double-sided optical sheet 120 is used as the sole optical sheet, which includes lenticular patterns on both sides. Light source 110 includes an array of LEDs (e.g., first, second, and third LEDs 111-113, etc.).

FIG. 10 shows a cross-sectional view of vehicle lamp assembly 400 with outer lens 130 removed. First lenticular pattern 121 is formed on a first side of optical sheet 120 and second lenticular pattern is formed on a second side of optical sheet 120, opposite the first side.

FIG. 11 shows a perspective view of vehicle lamp assembly 400 with the outer lens and optical sheet 120 removed to reveal the array of LEDs of light source 110. FIG. 12 shows a perspective view of vehicle lamp assembly 400 with only outer lens 130 removed to reveal double-sided optical sheet 120.

The above example features vehicle lamps for a car, but the lamp assembly could be applied in a range of other automotive applications such as, trucks, motorcycles, vans, and buses, as well as other equipment such as, lawn mowers, off-road vehicles, golf carts, and tractors. Additionally, lamps incorporating double-sided optical sheets may be used for commercial lighting (e.g., interior and exterior lighting for buildings).

In addition to extrusion processes and compression molding processes, other manufacturing methods could be used to produce double-sided optical sheets, such as injection molding and 3D printing. As one skilled in the art would conclude, there are a plurality of additional manufacturing techniques not mentioned in this disclosure that could be adapted to create optical sheets comprising lenticular patterns on both sides.

A range of materials may be used in the production of lenticular sheets. Typical materials used are acrylic, polyvinyl chloride (PVC), amorphous polyethylene terephthalate (APET), and polyethylene terephthalate modified with glycol (PETG), though one skilled in the art would recognize that various other materials could be used to manufacture optical sheets with lenticular patterns. The criteria for defining a viable material is that the material provides the desired optical properties (e.g., transparent, semi-transparent, partially opaque, etc.), and that the material is compatible with the process selected for forming lenticular patterns on both surfaces of the optical sheet.

Features described above as well as those claimed below may be combined in various ways without departing from the scope hereof. The following examples illustrate some possible, non-limiting combinations:

(A1) A lamp assembly includes a light source, an optical sheet oriented to receive light emitted from the light source, a first pattern of light-modifying elements disposed on a first side of the optical sheet, and a second pattern of light-modifying elements disposed on a second side of the optical sheet opposite the first side. Light from the light source is homogenized via the first pattern of light-modifying elements and the second pattern of light-modifying elements.

(A2) For the lamp assembly denoted as (A1), the first pattern of light-modifying elements may be oriented differently from the second pattern of light-modifying elements.

(A3) For the lamp assembly denoted as (A1) or (A2), the first pattern of light-modifying elements may be oriented perpendicular to the second pattern of light-modifying elements.

(A4) For the lamp assembly denoted as any of (A1) through (A3), the light source may include a plurality of lighting elements and the optical sheet may be configured to blend light emitted from the plurality of lighting elements such that one homogenous beam of light lacking hotspots is outputted from the lamp assembly.

(A5) For the lamp assembly denoted as any of (A1) through (A4), the plurality of lighting elements may include an array of light-emitting diodes.

(A6) For the lamp assembly denoted as any of (A1) through (A5), the first and second patterns of light-modifying elements may include patterns of lenticular lenses imprinted on opposite sides of the optical sheet.

(A7) For the lamp assembly denoted as any of (A1) through (A6), an outer lens may be disposed adjacent the optical sheet and opposite the light source such that light homogenized by the optical sheet is projected outside the lamp assembly via the outer lens.

(B1) An extrusion method for forming a double-sided optical sheet includes extruding a material from an extruder, imprinting a first lenticular pattern onto a first side of the material via a first drum, the first drum having a first pattern on its outer surface, and imprinting a second lenticular pattern onto a second side of the material opposite the first side via a second drum. The second drum has a second pattern on its outer surface, such that the material is formed into an optical sheet having the first lenticular pattern on the first side and the second lenticular pattern on a second side.

(B2) For the extrusion method denoted as (B1), after imprinting the first lenticular pattern and imprinting the second lenticular pattern, the method may include guiding the optical sheet via a third drum, the third drum having a flat outer surface.

(B3) For the extrusion method denoted as (B1) or (B2), the method may include arranging the first drum adjacent the second drum, arranging the second drum adjacent the third drum, feeding the material between the first drum and the second drum such that the first lenticular pattern and the second lenticular pattern are simultaneously imprinted into opposite sides of the material, and subsequently feeding the material between the second drum and the third drum.

(B4) For the extrusion method denoted as any of (B1) through (B3), the method may include arranging the first drum adjacent the second drum, arranging the second drum adjacent the third drum, feeding the material between the second drum and the third drum such that the second lenticular pattern is imprinted on the second side, and feeding the material between the second drum and the first drum such that the first lenticular pattern is subsequently imprinted on the first side.

(C1) A compression molding method for forming a double-sided optical sheet includes providing a first mold having a first mold pattern, providing a second mold having a second mold pattern, arranging the first mold adjacent the second mold to form a mold cavity, melting a material to form a melted material and providing the melted material to the mold cavity, cooling the material to solidify the material, and removing the first mold and the second mold such that a double-sided optical sheet is formed having a first optical pattern on a first side according to the first mold pattern and a second optical pattern on a second side, opposite the first side, according to the second mold pattern.

(C2) For the compression molding method denoted as (C1), the first optical pattern and the second optical pattern may each include a patterned array of lenticular lenses.

(C3) For the compression molding method denoted as (C1) or (C2), the method may include orienting the first mold pattern differently from the second mold pattern by an offset angle such that the first optical pattern is oriented differently from the second optical pattern by the offset angle.

(C4) For the compression molding method denoted as any of (C1) through (C3), the method may include orienting the first mold pattern perpendicular from the second mold pattern such that the first optical pattern is perpendicular from the second optical pattern.

Many different arrangements of the various components depicted, as well as components not shown, are possible without departing from the scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

The invention claimed is:

1. A lamp assembly for a vehicle, comprising:
an array of light-emitting diodes;
an optical sheet oriented to receive light emitted directly from the array of light-emitting diodes;
a first pattern of light-modifying elements disposed on a first side of the optical sheet, wherein the first pattern of light-modifying elements comprises a first parallel array of convex lenses aligned lengthwise in a first direction;
a second pattern of light-modifying elements disposed on a second side of the optical sheet opposite the first side, wherein the second pattern of light-modifying elements comprises a second parallel array of convex lenses aligned lengthwise in a second direction; and
the first direction is oriented differently from the second direction by an offset angle, wherein the first pattern of light-modifying elements scatters light according to the first direction and the second pattern of light-modifying elements scatters light according to the second direction configured to distribute light rays evenly such that light emitted from the lamp assembly appears homogenous.

2. The lamp assembly of claim 1, wherein the offset angle is about ninety degrees such that the first direction is oriented perpendicular to the second direction.

3. The lamp assembly of claim 1, wherein the optical sheet is configured to refract light in the first direction via the first pattern of light-modifying elements and in the second direction via the second pattern of light modifying elements, and the first pattern and the second pattern are configured to provide one homogenous beam of light lacking hotspots outputted from the lamp assembly.

4. The lamp assembly of claim 1, wherein the array of light emitting diodes comprises individual light-emitting diodes spaced apart from one another in both the first direction and the second direction.

5. The lamp assembly of claim 1, wherein the first and second patterns of light-modifying elements comprise patterns of lenticular lenses imprinted on opposite sides of the optical sheet.

6. The lamp assembly of claim 1, comprising an outer lens disposed adjacent the optical sheet and opposite the array of light-emitting diodes such that light homogenized by the optical sheet is projected outside the lamp assembly via the outer lens.

7. The lamp assembly of claim 1, wherein the first parallel array of convex lenses comprise substantially the same pattern of convex lenses as the second parallel array of convex lenses but aligned in a different direction.

8. The lamp assembly of claim 1, wherein the first direction is aligned laterally and the second direction is aligned vertically.

9. The lamp assembly of claim 1, wherein the first direction is aligned horizontally with respect to the vehicle and the second direction is aligned vertically with respect to the vehicle.

10. The lamp assembly of claim 6, wherein the outer lens is touching the optical sheet opposite the array of light-emitting diodes.

11. The lamp assembly of claim 1, wherein the optical sheet comprises an optically clear substantially transparent plastic.

* * * * *